(12) United States Patent
Yu et al.

(10) Patent No.: US 10,990,281 B2
(45) Date of Patent: Apr. 27, 2021

(54) RAM CONTROLLER CONFIGURED TO SELECTIVELY BOOT MEMORY AND METHOD OF OPERATING THE SAME

(71) Applicant: SAMSUNG ELECTRONICS CO., LTD., Suwon-si (KR)

(72) Inventors: Seong-Heon Yu, Suwon-si (KR); Joungyeal Kim, Yongin-si (KR); Miyoung Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/003,756

(22) Filed: Jun. 8, 2018

(65) Prior Publication Data

US 2019/0187899 A1 Jun. 20, 2019

(30) Foreign Application Priority Data

Dec. 18, 2017 (KR) .................. 10-2017-0174422

(51) Int. Cl.
| | |
|---|---|
| *G06F 1/32* | (2019.01) |
| *G06F 9/44* | (2018.01) |
| *G06F 13/24* | (2006.01) |
| *G11C 7/10* | (2006.01) |
| *G11C 11/406* | (2006.01) |
| *G06F 3/06* | (2006.01) |

(52) U.S. Cl.
CPC .......... *G06F 3/0604* (2013.01); *G06F 3/0629* (2013.01); *G06F 3/0679* (2013.01)

(58) Field of Classification Search
CPC .... G06F 3/0683; G06F 3/0679; G06F 3/0632; G06F 3/0629; G06F 1/3206; G06F 1/3228; G06F 1/3275; G06F 2/0625; G06F 3/0634
USPC .......................... 711/104, 154, 166, E12.001
See application file for complete search history.

(56) References Cited

U.S. PATENT DOCUMENTS

| | | | |
|---|---|---|---|
| 6,047,347 A * | 4/2000 | Hansen ............... | G06F 13/1678 710/307 |
| 7,162,627 B2 | 1/2007 | Chen | |
| 7,490,177 B2 | 2/2009 | Kao | |
| 8,533,444 B2 | 9/2013 | Jun | |
| 8,543,801 B2 | 9/2013 | Chu et al. | |
| 8,742,791 B1 | 6/2014 | Shimanek et al. | |
| 8,885,424 B2 | 11/2014 | Jeong et al. | |
| 9,251,068 B2 | 2/2016 | Grunzke | |
| 9,733,950 B2 * | 8/2017 | Samuel ................ | G06F 9/4408 |
| 9,998,112 B1 * | 6/2018 | Chang .................. | G06F 1/24 |
| 2002/0085418 A1 * | 7/2002 | Goto .................... | G11C 8/12 365/185.11 |

(Continued)

FOREIGN PATENT DOCUMENTS

| | | |
|---|---|---|
| JP | 5337661 B2 | 11/2013 |
| KR | 100912156 B1 | 8/2009 |

(Continued)

*Primary Examiner* — Yaima Rigol
*Assistant Examiner* — Edward Waddy, Jr.
(74) *Attorney, Agent, or Firm* — Volentine, Whitt & Francos, PLLC

(57) ABSTRACT

A random-access memory (RAM) controller is connected with multiple memories. The random-access memory controller selectively boots at least one memory of the multiple memories based on booting-related information about the multiple memories.

15 Claims, 19 Drawing Sheets

(56) References Cited

U.S. PATENT DOCUMENTS

| | | | |
|---|---|---|---|
| 2004/0128425 A1* | 7/2004 | Zitlaw | G06F 9/4403 |
| | | | 711/1 |
| 2012/0239918 A1* | 9/2012 | Huang | G06F 9/4401 |
| | | | 713/2 |
| 2016/0225431 A1 | 8/2016 | Best et al. | |
| 2018/0165101 A1* | 6/2018 | Bulusu | G06F 11/1417 |
| 2018/0189496 A1* | 7/2018 | Wu | G06F 9/4401 |
| 2018/0217846 A1* | 8/2018 | Lagnado | G06F 9/4416 |

FOREIGN PATENT DOCUMENTS

| | | |
|---|---|---|
| KR | 101211503 B1 | 12/2012 |
| KR | 1020140059684 A | 5/2014 |

\* cited by examiner

RAM CONTROLLER CONFIGURED TO SELECTIVELY BOOT MEMORY AND METHOD OF OPERATING THE SAME

CROSS-REFERENCE TO RELATED APPLICATIONS

This U.S. non-provisional patent application claims priority under 35 U.S.C. § 119 to Korean Patent Application No. 10-2017-0174422, filed on Dec. 18, 2017 in the Korean Intellectual Property Office, the disclosures of which are incorporated by reference herein in their entireties.

BACKGROUND

1. Technical Field

Embodiments of the present disclosure disclosed herein relate to a semiconductor device. More particularly, the present disclosure relates to a random-access memory (RAM) controller configured to selectively boot memories.

2. Description of the Related Art

A semiconductor memory refers to a memory device that is implemented using semiconductor such as silicon (Si), germanium (Ge), gallium arsenide (GaAs), indium phosphide (InP), or the like. Semiconductor memory devices are roughly classified as volatile memory devices or nonvolatile memory devices.

A volatile memory device is a memory device that loses data stored therein if a power supply is shut down, and a nonvolatile memory device is a memory device that retains data stored therein even though a power supply is shut down. A dynamic random-access memory (DRAM) is a kind of volatile memory device that has a fast access speed, such that the DRAM is widely used in computing systems as an operating memory, a buffer memory, a main memory, or the like. Demand for DRAM by industry such as for servers is increasing due to an increasing need to manage a large amount of data.

Reliability of DRAMs is very important in terms of a characteristic of a memory for industry that has to operate for a long time and without a break. However, since the DRAMs always operate to retain and manage data stored therein, the degradation of the DRAMs may unnecessarily increase. To solve such an issue, industry is investigating ways to appropriately assign a channel connected to the DRAMs. However, since all DRAMs operate in the process of booting, there is no difference between the above-described way and existing ways in that all DRAMs are degraded. Therefore, to solve the above-described issue, techniques for improving the reliability and lifespan of a DRAM are required.

SUMMARY

Embodiments of the present disclosure provide a RAM controller configured to selectively boot multiple memories.

Embodiments of the present disclosure provide a method of selectively booting multiple memories connected to a RAM controller.

According to an exemplary embodiment, a random-access memory (RAM) controller connected with multiple memories may include a reset control unit that selectively boots at least one memory of the plurality of memories based on booting-related information about the plurality of memories.

According to an exemplary embodiment, an operation method of a RAM controller connected with multiple memories may include receiving a reset signal, selecting at least one memory of the plurality of memories based on booting-related information about the plurality of memories, and providing the reset signal to the selected at least one memory.

According to an exemplary embodiment, an electronic device connected with multiple memories may include a read only memory (ROM) that executes a boot code, a reset circuit that generates a reset signal with execution of the boot code, and a RAM controller that selectively provides the reset signal to at least one memory of the plurality of memories, based on booting-related information about the plurality of memories.

BRIEF DESCRIPTION OF THE FIGURES

The above and other objects and features of the present disclosure will become apparent by describing in detail exemplary embodiments thereof with reference to the accompanying drawings.

DETAILED DESCRIPTION

Below, embodiments of the present disclosure may be described in detail and clearly to such an extent that an ordinary one in the art easily implements the inventive concepts described herein.

Figure 1:
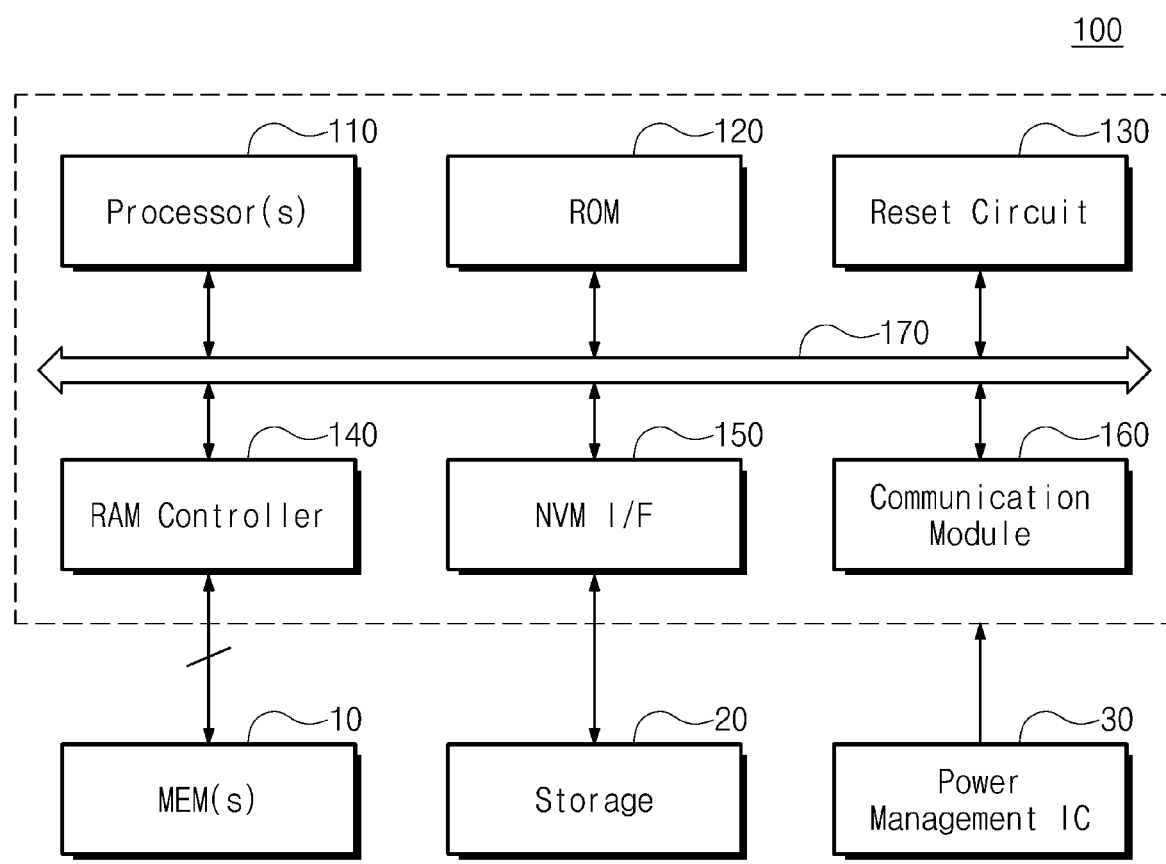
FIG. 1 is a block diagram illustrating an exemplary configuration of an electronic device including a RAM controller according to an embodiment.

FIG. 1 is a block diagram illustrating an exemplary configuration of an electronic device 100 including a RAM controller 140 according to an embodiment. A plurality of (i.e., multiple) memories 10 and storage 20 connected to the electronic device 100 are illustrated in FIG. 1 together with the electronic device 100. Additionally, a power management integrated circuit 30 (PMIC) supplying a power supply voltage $V_{DD}$ is illustrated in FIG. 1 together with the electronic device 100. A RAM controller 140 may be implemented with a circuit, with a processor that executes instructions, or a combination of a circuit and a processor that executes instructions. Similarly, units described herein, including a reset control unit, may be implemented with a circuit, with a processor that executes instructions, or a combination of a circuit and a processor that executes instructions. The same is true of "logic" as described herein.

The electronic device 100 may include one or more processor 110, a ROM 120 (read only memory), a reset circuit 130, the RAM controller 140, a nonvolatile memory interface circuit 150, a communication module 160, and a bus 170. For example, the electronic device 100 may be one of electronic devices such as a desktop computer, a laptop computer, a tablet, a smartphone, a wearable device, a video game console, a workstation, a server, etc. Alternatively, the electronic device 100 may be a system on chip (SoC) implemented within such electronic devices.

The processor 110 may control overall operations of the electronic device 100. The processor 110 may process various kinds of arithmetic operations and/or logical operations. To this end, the processor 110 may include an application specific integrated circuit (ASIC), a field-programmable gate array (FPGA), a dedicated microprocessor, a microprocessor, etc. For example, the processor 110 may include one or more processor cores and may be implemented with a general-purpose processor, a special-purpose processor, or an application processor.

In a booting operation of the electronic device 100, the processor 110 may load a boot code stored in the ROM 120 to at least one of the plurality of memories 10 and may control the booting operation of the electronic device 100. In addition, in an operation of the electronic device 100, the processor 110 may load an update code stored in the ROM 120 to at least one of the memories 10 and may control an operation of updating firmware stored in the storage 20.

The ROM 120 may store the boot code and the update code. The boot code may include codes for initializing components of the electronic device 100 upon booting the electronic device 100. For example, the boot code may include a code for loading firmware stored in the storage 20. The update code may include a code for updating firmware stored in the storage 20.

The reset circuit 130 may generate a reset signal for initializing components of the electronic device 100 and components connected to the electronic device 100. For example, the reset signal may be a power on reset (POR) signal and/or a hardware reset signal. The reset circuit 130 may generate the reset signal, based on power provided from the power management integrated circuit 30 in the booting operation of the electronic device 100.

The RAM controller 140 may provide interfacing between the electronic device 100 and the memories 10. The RAM controller 140 may access at least one of the memories 10 depending on a request of the processor 110 or any hardware functional block (e.g., other intellectual property blocks (IP blocks) such as unique circuits that may be individually protected or protectable as intellectual property). For example, the RAM controller 140 may record data in at least one of the memories 10 depending on a write request of the processor 110. For example, the RAM controller 140 may read data from the memories 10 depending on a read request of the processor 110. As will be more fully described later, the RAM controller 140 may be configured to boot only at least one memory of the memories 10 in the booting operation of the electronic device 100.

The communication module 160 may communicate with an external device/system of the electronic device 100. For example, the communication module 160 may be an intellectual property block, a circuit, or a semiconductor chip manufactured independently of the processor 110. Alternatively, in the case where the processor 110 is implemented with an application processor, a function of at least a part of the communication module 160 may be merged in the application processor as the processor 110.

For example, the communication module 160 may support at least one of various wireless communication protocols such as long term evolution (LTE), worldwide interoperability for microwave access (WiMax), global system for mobile communication (GSM), code division multiple access (CDMA), Bluetooth, near field communication (NFC), wireless fidelity (Wi-Fi), radio frequency identification (RFID), etc. and/or at least one of various wired communication protocols such as transfer control protocol/Internet protocol (TCP/IP), universal serial bus (USB), Firewire, etc.

The bus 170 may provide a communication path between components of the electronic device 100. The components of the electronic device 100 may exchange data with each other based on a bus format of the bus 170. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), etc.

Various devices for storing data may be connected to the electronic device 100. For example, the memories 10 may be connected to the electronic device 100 for temporarily storing data and storage 20 may be connected to the electronic device 100 for (semi)-permanently storing data.

During the booting operation, an operating system (OS), basic application programs, and/or firmware are loaded to the memories 10. For example, during the booting operation of the electronic device 100, an OS image stored in the storage 20 may be loaded to at least one of the memories 10 according to a booting sequence. Overall input/output operations of the electronic device 100 may be supported by the operating system OS. In addition, application programs and/or firmware selected by a user or for providing a basic service may be loaded to at least one of the memories 10.

The memories 10 may store data to be used for an operation of the electronic device 100. For example, the memories 10 may temporarily store data that are processed or will be processed by the processor 110. For example, the memories 10 may include a volatile memory, such as a dynamic random-access memory (DRAM), a synchronous DRAM (SDRAM), etc. and/or a nonvolatile memory, such as a phase-change RAM (PRAM), a magneto-resistive RAM (MRAM), a resistive RAM (ReRAM), a ferro-electric RAM (FRAM), etc. However, for ease of description, below, it is assumed that the memories 10 are DRAMs that are based on a double data rate (DDR) interface.

The storage 20 may include one or more memory devices and a controller. The memory devices of the storage 20 may retain data regardless of power supply. For example, the storage 20 may include a nonvolatile memory device such as a flash memory, a PRAM, an MRAM, a ReRAM, or an FRAM. For example, the storage 20 may include a storage medium such as a solid-state drive (SSD), removable storage, embedded storage, etc.

The power management integrated circuit 30 may power the electronic device 100, the memories 10, and the storage 20. The power management integrated circuit 30 may be configured to generate voltages of levels suitable for respective components. In particular, the power management integrated circuit 30 may generate a voltage that is used for the reset circuit 130 to generate the reset signal.

However, according to an embodiment, one or more elements in FIG. 1 (e.g., components such as, but not limited to, the communication module 160 and the like) of the electronic device 100 may be omitted.

Figure 2:
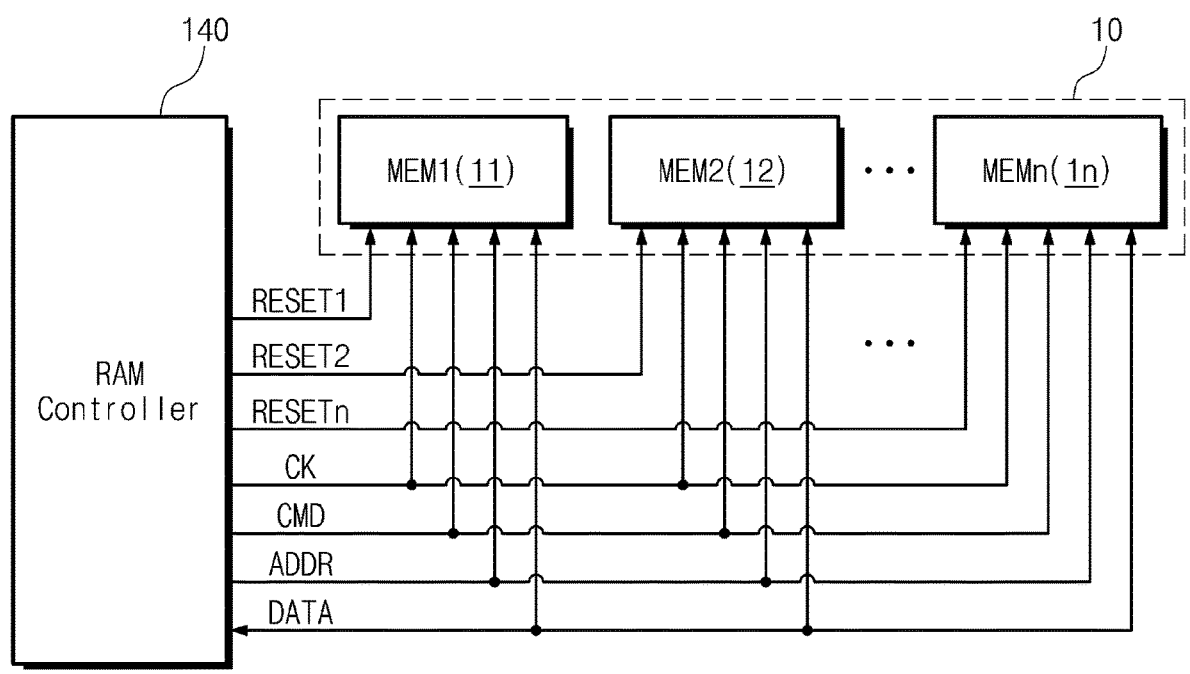
FIG. 2 is a block diagram illustrating a RAM controller illustrated in FIG. 1 and multiple memories connected to the RAM controller.

FIG. 2 is a block diagram illustrating the RAM controller 140 and the memories 10 connected to the RAM controller 140, which are illustrated in FIG. 1. For better understanding, a description will be given with reference to FIGS. 1 and 2 together.

The RAM controller 140 may be connected with multiple memories from first memory 11 to n-th memory 1n. However, the RAM controller 140 may also not be electrically connected to one or more of the memories 11 to 1n at some times for some operations. For example, the RAM controller 140 may be configured to boot only at least one memory of the memories 11 to 1n in the booting operation of the electronic device 100. To boot only at least one memory, the RAM controller 140 may be configured to provide a reset signal generated by the reset circuit 130 to at least one memory selected from the memories 11 to 1n.

For clarity of illustration, a reset signal provided to the first memory 11 is marked with a first reset signal RESET1, a reset signal provided to the second memory 12 is marked with a second reset signal RESET2, and a reset signal provided to the n-th memory 1n is marked with an n-th reset signal RESETn. However, the reset signals RESET1 to RESETn may come from or be based on the same reset signal generated by the reset circuit 130.

The RAM controller 140 may provide the selected at least one memory with a clock CK, a command CMD, and an address ADDR through lines connected in common to the plurality of memories 11 to 1n. The RAM controller 140 may exchange data "DATA" with at least one memory selected from the memories 11 to 1n. Since only a memory which is initialized by the reset signal is booted, the data "DATA" are exchanged only between the RAM controller 140 and the initialized memory.

In addition, the RAM controller 140 may allow a different memory to be booted whenever the electronic device 100 is booted, by using booting-related information of the memories 11 to 1n. For example, the RAM controller 140 may select a memory to be booted among the memories 11 to 1n, based on the booting-related information including the number of booting operations of each of the memories 11 to 1n and/or an operating time of each of the memories 11 to 1n. As a result, a booting operation may be sequentially performed from a memory having the smallest number of booting operations or having the shortest operating time.

In other words, the RAM controller 140 may count the number of booting operations of each of the memories 11 to 1n to use as the basis of the booting-related information. The RAM controller 140 may also check respective operating times associated with each of the memories 11 to 1n to use as the basis of the booting-related information. The number of booting operations may be counted by a counter for each of the memories 11 to 1n over time, such as over a fixed time or a variable time with varying starting points, such as an event-based time. An example of a variable starting time may be time of installation in a device or system, which may vary for different memories from first memory 11 to n-th memory 1n. The operating time may also be counted or checked over time by a timer, such as over a fixed time or a variable time.

According to the scheme to sequentially boot the memories 11 to 1n, all the memories 11 to 1n are not unnecessarily booted, but only a memory (or memories) corresponding to a capacity necessary to drive the electronic device 100 is booted. In other words, a capacity of only one memory may be used so as to avoid unnecessarily booting other memories. Therefore, since memories are prevented from being excessively degraded due to unnecessary booting, the whole reliability and lifespan of the memories 11 to 1n may be improved.

Figure 3:
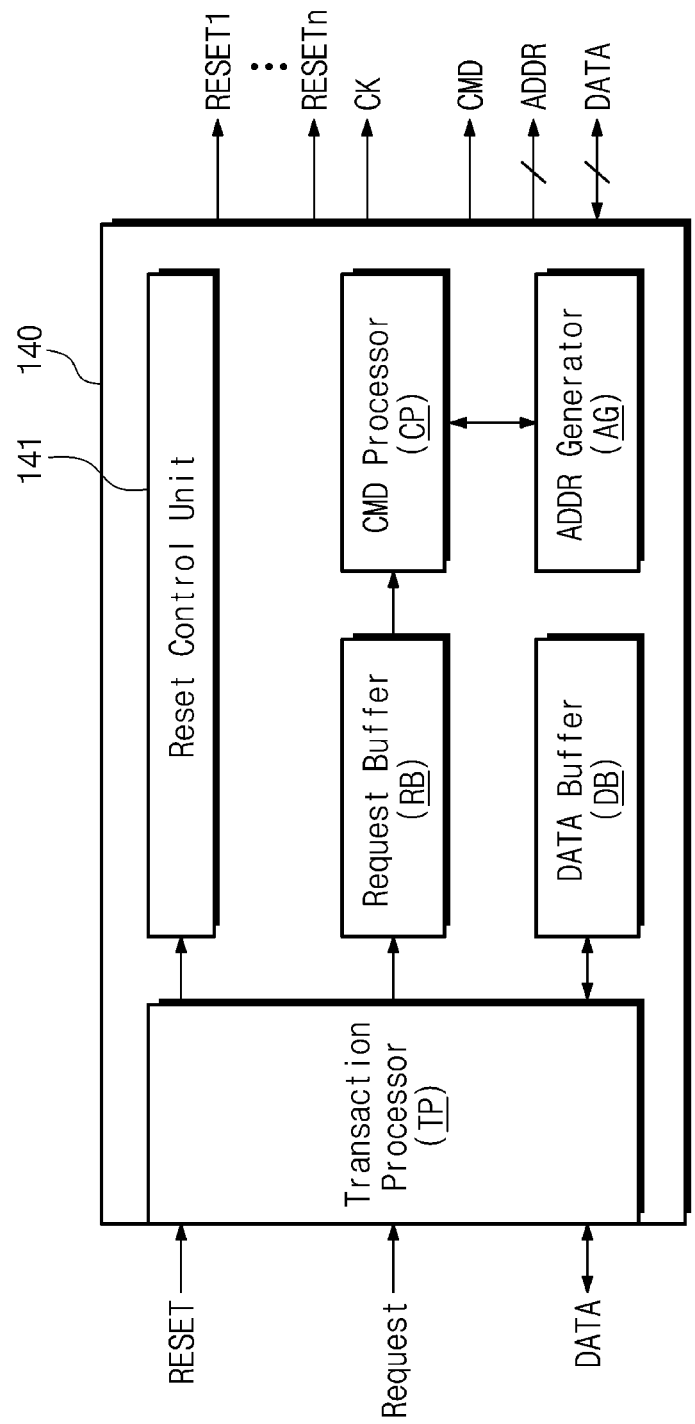
FIG. 3 is a block diagram illustrating an exemplary configuration of the RAM controller illustrated in FIGS. 1 and 2.

FIG. 3 is a block diagram illustrating an exemplary configuration of the RAM controller 140 illustrated in FIGS. 1 and 2. The RAM controller 140 may include a reset control unit 141. The RAM controller 140 may further include a transaction processor TP, a request buffer RB, a command processor CP, a data buffer DB, and an address generator AG.

The reset control unit 141 may be configured to select at least one of the memories 11 to 1n based on the booting-related information of the memories 11 to 1n and to provide a reset signal RESET to the selected memory. For example, the reset control unit 141 may be configured to measure and store the number of booting operations and/or an operating time (i.e., the booting-related information) of each of the memories 11 to 1n. For example, the reset control unit 141 may include, circuitry such as a field-programmable gate array (FPGA), a register, etc.

The reset control unit 141 may update the booting-related information of each of the memories 11 to 1n, and the booting-related information may be utilized in a next booting operation. For example, in a next booting operation, the reset control unit 141 may select a memory, which has the smallest number of booting operations or is driven for the least amount of time, from among the memories 11 to 1n based on the updated booting-related information.

The transaction processor TP may process multiple write and read requests. For example, the transaction processor TP may include various logic circuits for arbitrating or classifying write and read requests. For example, the transaction processor TP may classify/sort requests in a sequential manner (i.e., a first-in-first-out manner). Alternatively, the transaction processor TP may classify/sort requests depending on various algorithms optimized to access the memories 11 to 1n. The classified/sorted requests may be stored in the request buffer RB.

In addition, the transaction processor TP may arbitrate processing of exchanged data "DATA". For example, the transaction processor TP may process an input/output of data in a sequential manner (i.e., a first-in-first-out manner). Alternatively, the transaction processor TP may process an input/output of data depending on various algorithms for optimizing the input/output throughput of data. Data "DATA" that are processed or will be processed by the transaction processor TP may be stored in the data buffer DB.

An example is illustrated in FIG. 3 as the reset signal RESET is input to the transaction processor TP. However, in another embodiment, the reset signal RESET may be directly input to the reset control unit 141.

The command processor CP may generate the command CMD for performing a read operation or a write operation on a memory selected from the memories 11 to 1n, based on the requests stored in the request buffer RB.

The address generator AG may generate the address ADDR for accessing the selected memory of the memories 11 to 1n, based on the write and read requests and/or the command CMD generated by the command processor CP.

The above-described exemplary configuration of the RAM controller 140 including the transaction processor TP, the request buffer RB, the data buffer DB, the command processor CP, and the address generator AG shows only an example for generating various signals needed to access the memories 11 to 1n. That is, the configuration of the RAM controller 140 to which the reset control unit 141 is applied is not limited thereto, and the RAM controller may have various configurations for controlling multiple memories.

Figure 4:
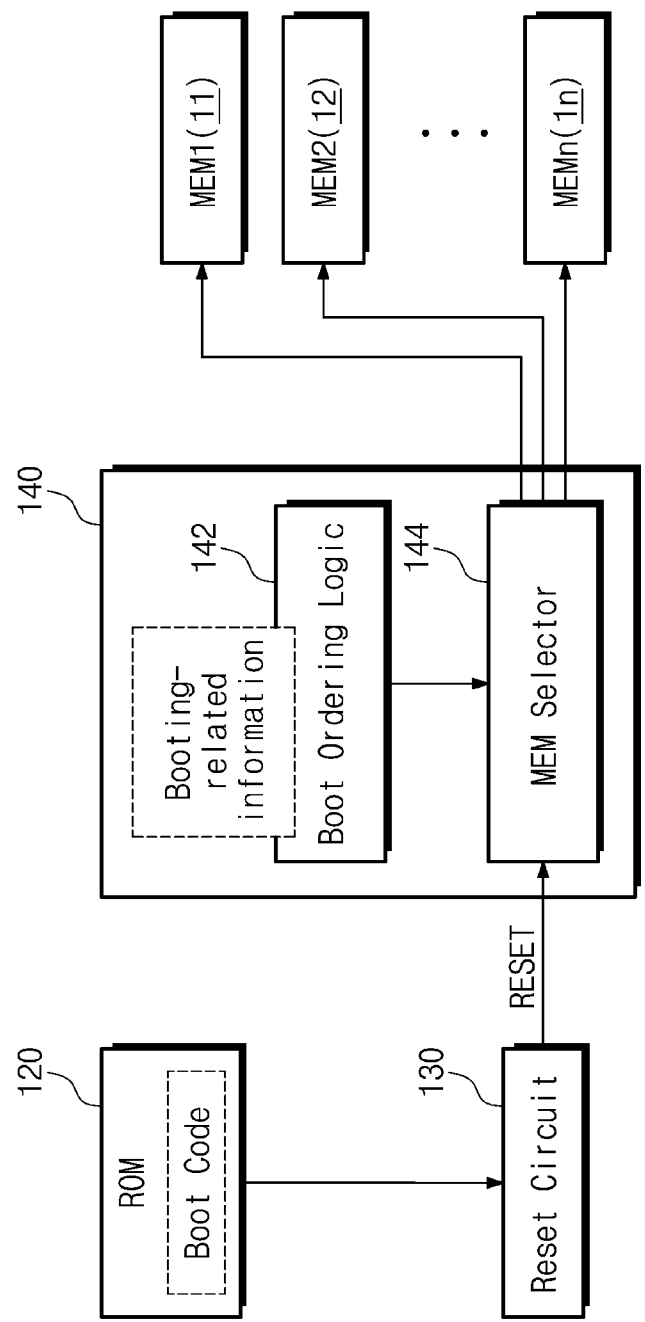
FIG. 4 is a block diagram illustrating an exemplary configuration of an electronic device according to an embodiment of the present disclosure.

FIG. 4 is a block diagram illustrating an exemplary configuration of an electronic device according to an embodiment of the present disclosure. The embodiment of FIG. 4 shows that the reset control unit 141 (refer to FIG. 3) is implemented with boot ordering logic 142 and a memory selector 144. Logic described herein as an element of an electronic device is implemented as a circuit, by a processor executing instructions, or by a combination of a circuit and a processor executing instructions. For better understanding, in addition to an electronic device, the memories 11 to 1n connected to the electronic device are together illustrated in FIG. 4, and a description will be given with reference to FIGS. 1 and 3 together.

The electronic device includes the ROM 120, the reset circuit 130, and the RAM controller 140. The RAM controller 140 may include the boot ordering logic 142 and the memory selector 144. The memories 11 to 1n may be connected to the RAM controller 140. In FIG. 4, lines connecting the plurality of memories 11 to 1n and the RAM controller 140 are lines through which reset signals are transmitted, and any other lines are not illustrated for brevity of illustration.

If the electronic device 100 is powered on, an initialization operation may be performed based on the boot code stored in the ROM 120. As part of the initialization operation using the boot code, the ROM 120 may generate the reset signal RESET based on power generated by the power management integrated circuit 30. For example, the reset signal RESET may be a power on reset (POR) signal or a hardware reset signal.

The RAM controller 140 may manage the booting-related information for selecting a memory to be booted among the memories 11 to 1n. For example, the boot ordering logic 142 may manage a memory to be booted, based on the booting-related information. The booting-related information includes information about the number of booting operations of each of the memories 11 to 1n and/or information about a time when each of the memories 11 to 1n operates. For example, the boot ordering logic 142 may include circuitry such as a FPGA, a register, or the like for storing the booting-related information.

The RAM controller 140 may select a memory to be booted, based on the booting-related information. For example, the RAM controller 140 may select a memory, which has the smallest number of booting operations or has the shortest operating time, from among the memories 11 to 1n. For example, the memory selector 144 may include circuitry such as a switch or multiplexer for selecting a memory under control of the boot ordering logic 142.

Figure 5:
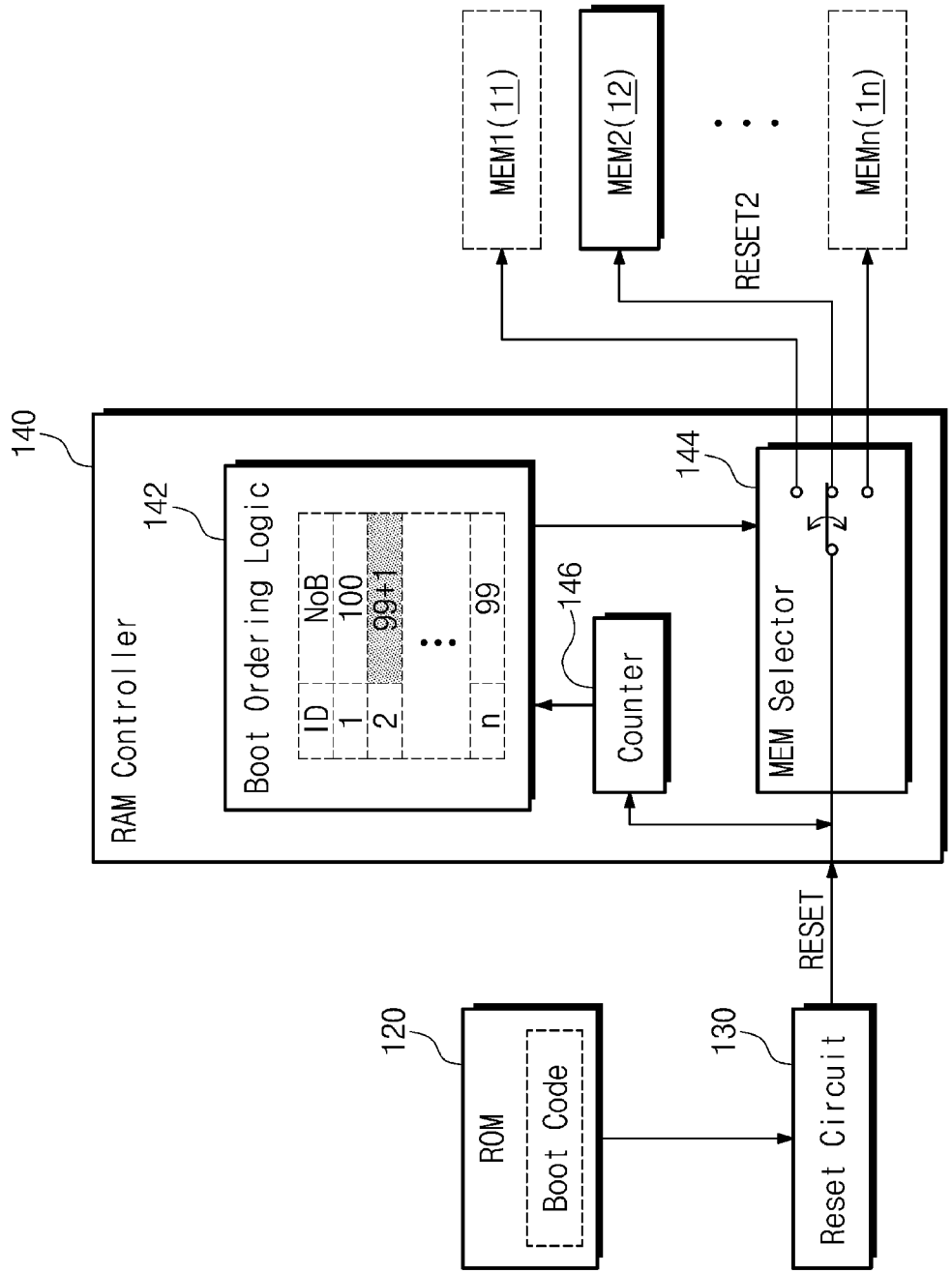
FIG. 5 is a block diagram illustrating an exemplary configuration of a RAM controller illustrated in FIG. 4.

FIG. 5 is a block diagram illustrating an exemplary configuration of a RAM controller illustrated in FIG. 4. The RAM controller 140 may include the boot ordering logic 142, the memory selector 144, and a counter 146.

In the booting operation of the electronic device 100, the reset signal RESET generated by the reset circuit 130 may be input to only one (or fewer than all) of the memories 11 to 1n. Instead, the boot ordering logic 142 may allow the memory selector 144 to select a memory, which has the smallest number of booting operations, based on the booting-related information. For example, the booting-related information may be a table associated with an ID and the number of booting operations NoB of each of the memories 11 to 1n.

It is assumed that the number of booting operations for each memory until a previous booting operation (i.e., not including the current booting operation) is the same as that of the table stored in the boot ordering logic 142. That is, it is assumed that the number of booting operations of the first memory 11 is "100" and the number of booting operations of each of the remaining memories from second memory 12 to n-th memory 1n is "99".

If the reset signal RESET is detected, the boot ordering logic 142 may determine that a memory among the memories 11 to 1n which has the smallest number of booting operations, is to be booted, by referring to the table. For example, the boot ordering logic 142 may determine that a memory (i.e., the second memory 12) has to be booted in the ID order or may determine that any memory of the second memory 12 to n-th memory 1n has to be booted.

The memory selector 144 may select a memory (e.g., the second memory 12) to be booted, based on the determination result of the boot ordering logic 142. For example, the memory selector 144 may include transistors or a multiplexer for providing the reset signal RESET to the selected memory. As the second memory 12 is selected, the reset signal RESET may be provided to the second memory 12. In this case, the second memory 12 may be initialized by the reset signal RESET, thus performing various training operations accompanied in the initialization operation.

In addition, the counter 146 may detect the reset signal RESET received from the reset circuit 130, and the detection result may be utilized to update the table stored in the boot ordering logic 142. That is, since the second memory 12 is booted in a current booting operation, the boot ordering logic 142 may update the number of times that the second memory 12 is booted.

Figure 6:
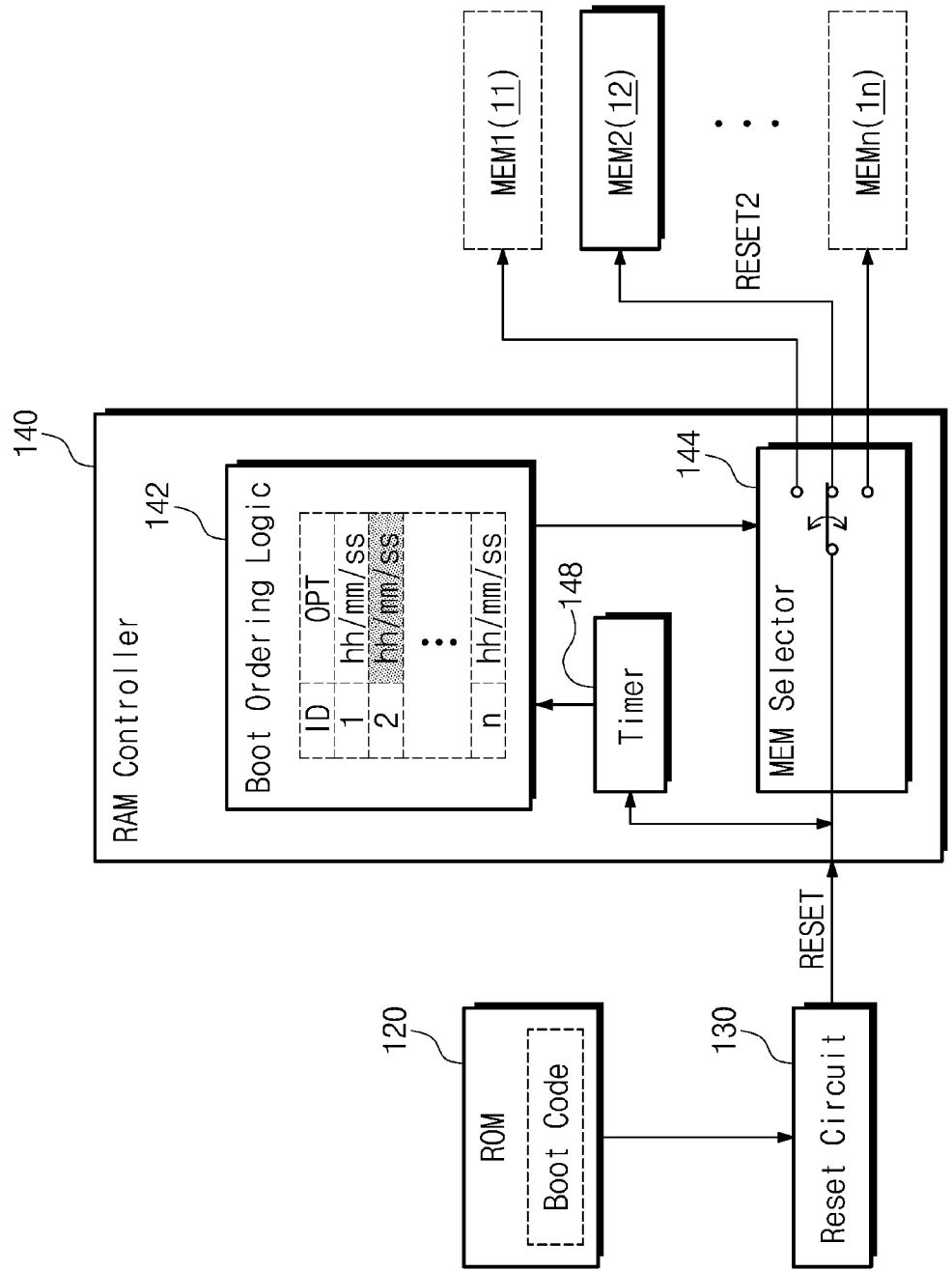
FIG. 6 is a block diagram illustrating another exemplary configuration of a RAM controller illustrated in FIG. 4.

FIG. 6 is a block diagram illustrating another exemplary configuration of a RAM controller illustrated in FIG. 4. Unlike the boot ordering logic 142 of the embodiment of FIG. 5, the boot ordering logic 142 according to an embodiment illustrated in FIG. 6 uses more precise information about booting of the memories 11 to 1n. The RAM controller 140 may include the boot ordering logic 142, the memory selector 144, and a timer 148.

If an input of the reset signal RESET from the reset circuit 130 is detected in the booting operation of the electronic device 100, the timer 148 may check a time point at which the reset signal RESET is received.

The boot ordering logic 142 determines a memory to be booted among the memories 11 to 1n, based on the booting-related information. The booting-related information may include information about an ID and an operating time OPT of each of the memories 11 to 1n. For example, the booting-related information may be managed/stored in the boot ordering logic 142 in the form of a table. For example, the boot ordering logic 142 may manage an operating time of each of the memories 11 to 1n in units of hour/minute/second (hh/mm/ss), though the units of the operating time are not limited thereto.

In the case where it is determined that the operating time of the second memory 12 of the memories 11 to 1n is the shortest, the boot ordering logic 142 controls the memory selector 144 such that the reset signal RESET is provided to the second memory 12. In this case, only the second memory 12 of the memories 11 to 1n is initialized, and the remaining memories 11 and 13 to 1n are not initialized.

Afterwards, if power-off is detected, the timer 148 may check a time at which the power-off is detected. A time from a time point at which the reset signal RESET is received to a time point at which the power-off is detected may be regarded as an operating time of the second memory 12. The boot ordering logic 142 may update the operating time of the second memory 12 recorded in the table including the booting-related information.

Figure 7:
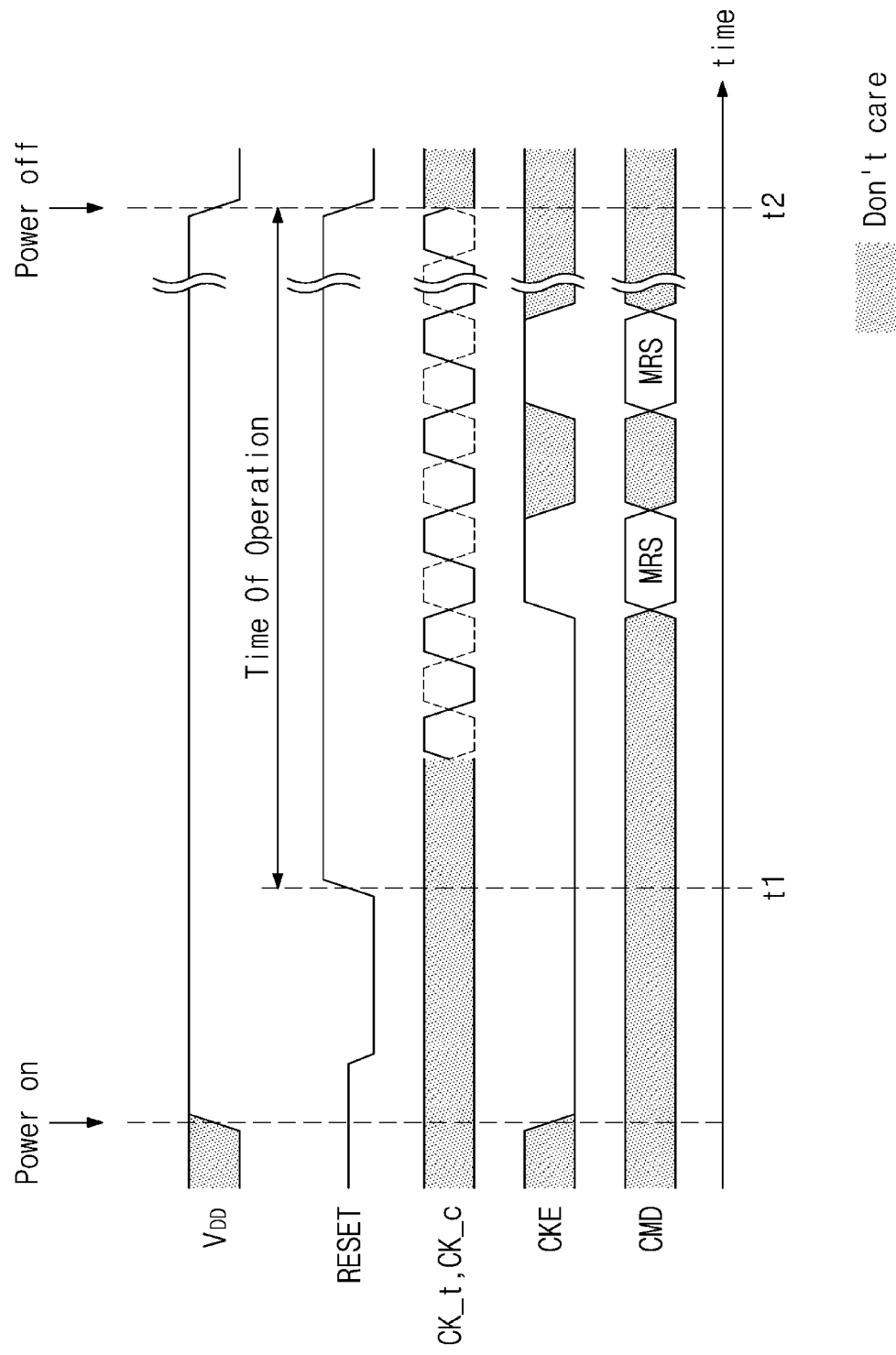
FIG. 7 is a timing diagrams illustrating waveforms of signals provided to a memory selected in the embodiment of FIG. 6.

FIG. 7 is a timing diagrams illustrating waveforms of signals provided to a memory (i.e., the second memory 12) selected in the embodiment of FIG. 6. Some signals of various signals provided to the second memory 12 are exemplified in FIG. 7. For better understanding, a description will be given with reference to FIGS. 1 and 6 together.

If the electronic device 100 is powered on, the power supply voltage $V_{DD}$ generated by the power management integrated circuit 30 is provided to various components of the electronic device 100. Even though one power supply voltage $V_{DD}$ is exemplified, it may be understood that the electronic device 100 provides various levels of voltages needed to drive components of the electronic device 100 or components connected to the electronic device 100.

If the electronic device 100 is powered on, the boot code stored in the ROM 120 is executed, and thus, the reset signal RESET is generated by the reset circuit 130. For example, the reset signal RESET may be a low enable signal (or a low active signal) that is activated in a logical low period.

The timer 148 may check a first time point t1 at which the reset signal RESET transitions from logical low to logical high. Since the second memory 12 is booted at the first time point t1, the second memory 12 may be regarded as operating from the first time point t1. Afterwards, as clocks CK_t and CK_c, a clock enable signal CKE, and a command CMD are provided to the second memory 12, various training operations may be performed on the second memory 12, and data exchange may be made.

If the electronic device 100 is powered off, the reset signal RESET may transition from logical high to logical low. The timer 148 may check a second time point t2 at which the reset signal RESET transitions from logical high to logical low. As such, a time from the first time point t1 to the second time point t2 may be regarded as the operating time of the second memory 12.

The boot ordering logic 142 may update the table associated with the booting-related information with reference to the operating time of the second memory 12. The updated booting-related information may be utilized for a next booting operation.

According to the embodiments described with reference to FIGS. 5 to 7, unlike a general case where all memories connected to an electronic device are together booted in a booting operation of the electronic device, the remaining memories 11 and 13 to 1n other than the selected second memory 12 are not booted in a booting operation of the electronic device 100. Therefore, since memories unnecessary for a booting operation are prevented from being booted, the memories may be prevented from being degraded. This may mean that the whole reliability and lifespan of the memories 11 to 1n are improved.

Figure 8:
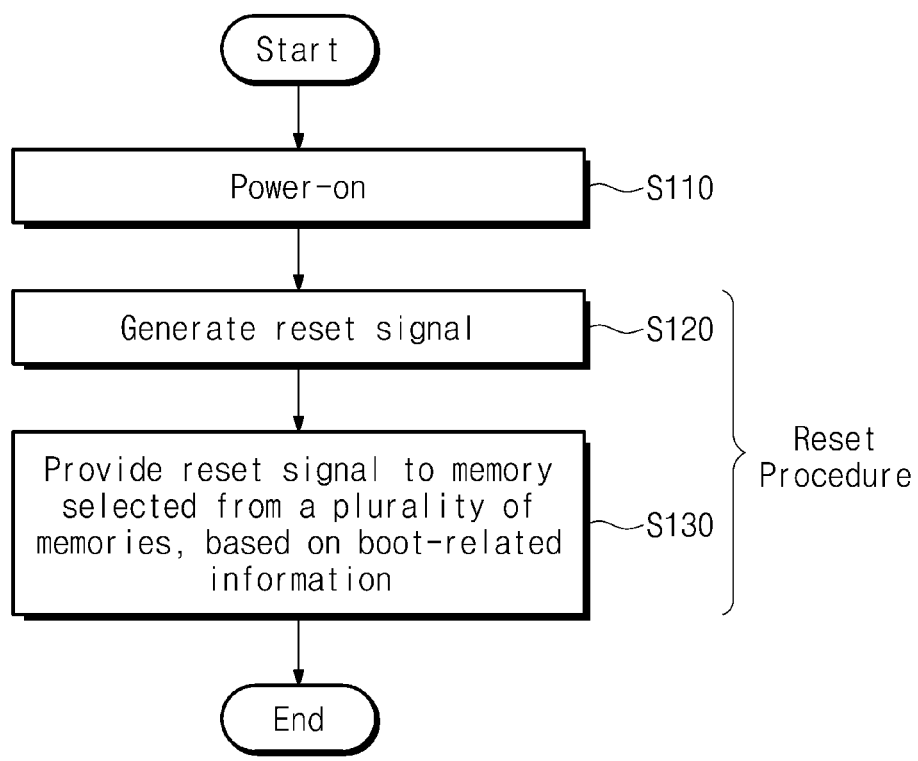
FIG. 8 is a flowchart illustrating an operating method of an electronic device according to an embodiment of the present disclosure.

FIG. 8 is a flowchart illustrating an operating method of an electronic device according to an embodiment of the present disclosure. For better understanding, a description will be given with reference to FIGS. 1 and 4 together.

In operation S110, the electronic device 100 is powered on. The power management integrated circuit 30 may provide various levels of voltages needed to operate components (e.g., the memories 10 and the storage 20) connected to the electronic device 100, as well as components of the electronic device 100. As the electronic device 100 is powered on, the boot code stored in the ROM 120 is executed.

In operation S120, the reset signal RESET may be generated by the reset circuit 130. The reset signal RESET may initialize the components of the electronic device 100 and the components connected to the electronic device 100. For example, the reset signal RESET may be a power on reset (POR) signal or a hardware reset signal.

In operation S130, the reset signal RESET may be provided to a memory that is selected from the memories 11 to 1n based on the booting-related information. For example, the booting-related information may include information about the number of booting operations and/or an operating time of each of the memories 11 to 1n. According to the above description, only the selected memory is reset, and the remaining memories are not booted.

Figure 9:
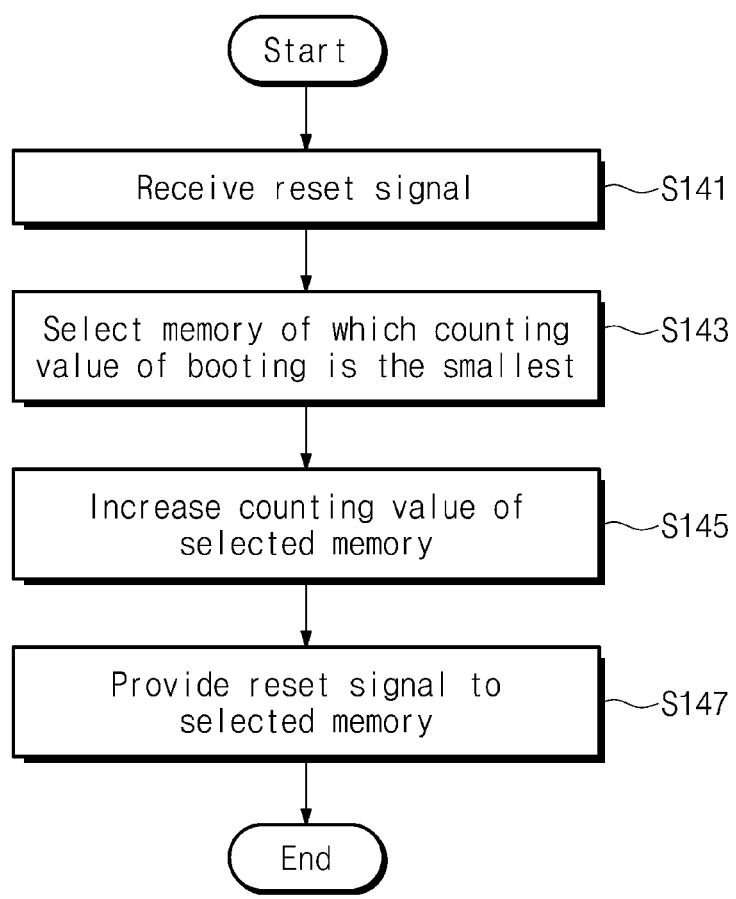
FIG. 9 is a flowchart illustrating operation S130 illustrated in FIG. 8.

FIG. 9 is a flowchart illustrating operation S130 of FIG. 8. For better understanding, a description will be given with reference to FIG. 5 and FIG. 9 together.

In operation S141, the RAM controller 140 receives the reset signal RESET.

In operation S143, a memory having the smallest number of booting operations is selected. For example, the boot ordering logic 142 may control the memory selector 144 by referring to the table including information about an ID and the number of booting operations of a memory. The memory selector 144 may be a circuit that is configured to perform a switching operation for providing the reset signal RESET to a to-be-booted memory under control of the boot ordering logic 142.

In operation S145, a counting value associated with the number of booting operations of the selected memory may increase. For example, if the second memory 12 is selected as a memory to be booted, depending on a result of determining that the second memory 12 has the smallest number of booting operations, the number of booting operations of the second memory 12 may increase by "1".

In operation S147, the reset signal RESET is provided to the selected memory. Since the memory selector 144 selects only one memory of the memories 11 to 1n, the reset signal RESET is not provided to unselected memories. Afterwards, depending on a given procedure, various training operations may be performed on the selected memory, and read and write operations may be performed on the selected memory.

Figure 10:
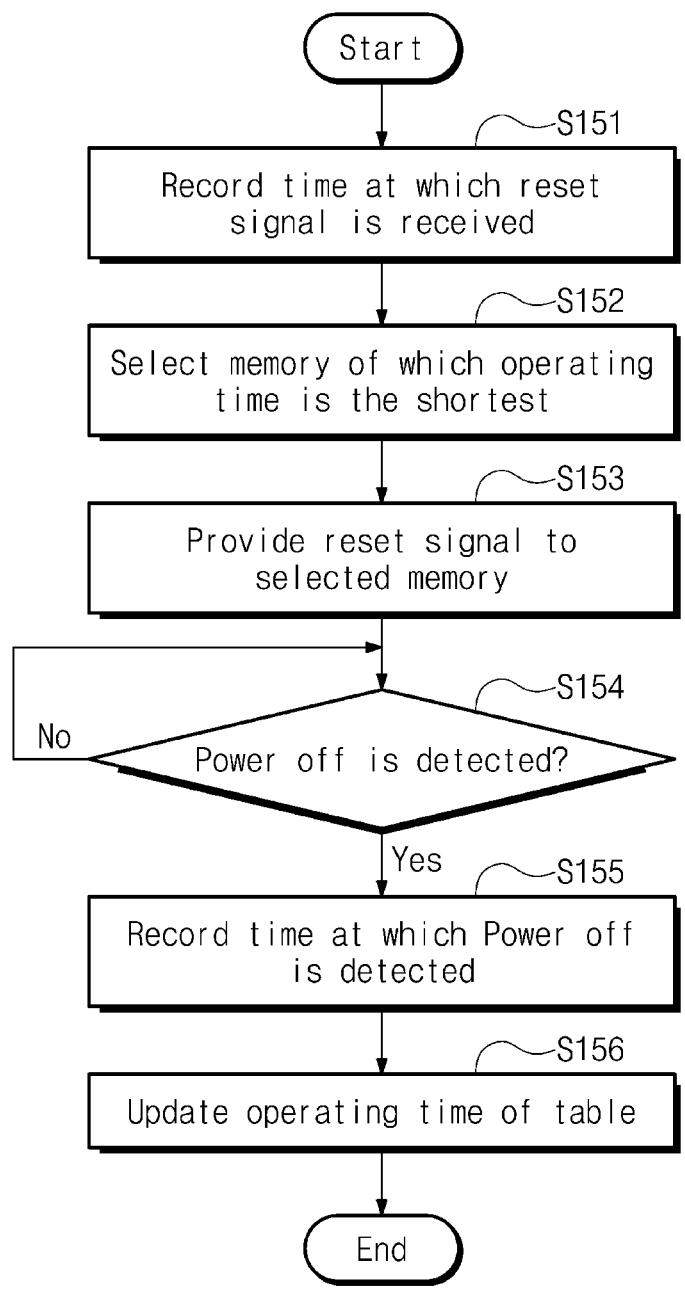
FIG. 10 is a flowchart illustrating another embodiment of operation S130 illustrated in FIG. 8.

FIG. 10 is a flowchart illustrating another embodiment of operation S130 illustrated in FIG. 8. For better understanding, a description will be given with reference to FIGS. 6 and 7 together.

In operation S151, a time at which the reset signal RESET is received is recorded. For example, the RAM controller 140 may detect a time point at which the reset signal RESET (e.g., a low enable signal) transitions from logical low to logical high. An operating time of a memory which is not yet selected but which is to be selected may be calculated from the time point at which the reset signal RESET is received.

In operation S152, a memory with the shortest operating time is selected from among the memories 11 to 1n. For example, the boot ordering logic 142 may select a memory to be booted, based on the table including information about an ID and an operating time of each of the memories 11 to 1n. For example, the information about the operating time may be managed in units of hour/minute/second, though the operating time is not limited to these units.

In operation S153, the reset signal RESET is provided to the selected memory. As such, various training operations may be performed on the selected memory, and read and write operations may be performed on the selected memory.

In operation S154, power-off may be detected. If power-off is detected, in operation S155, a time at which power-off is detected may be recorded. For example, the RAM controller 140 may detect a time point at which the reset signal RESET (e.g., a low enable signal) transitions from logical high to logical low, and the timer 148 may record the time point at which the reset signal RESET transitions from logical high to logical low.

In operation S156, an operating time of the table associated with the booting-related information is updated. That is, a time between the time point t1 when the reset signal RESET transitions from logical low to logical high and the time point t2 when the reset signal RESET transitions from logical high to logical low may be regarded as an operating time of the selected memory. The updated table may be utilized to select a memory to be booted among the memories 11 to 1n, in a next booting operation.

Figure 11:
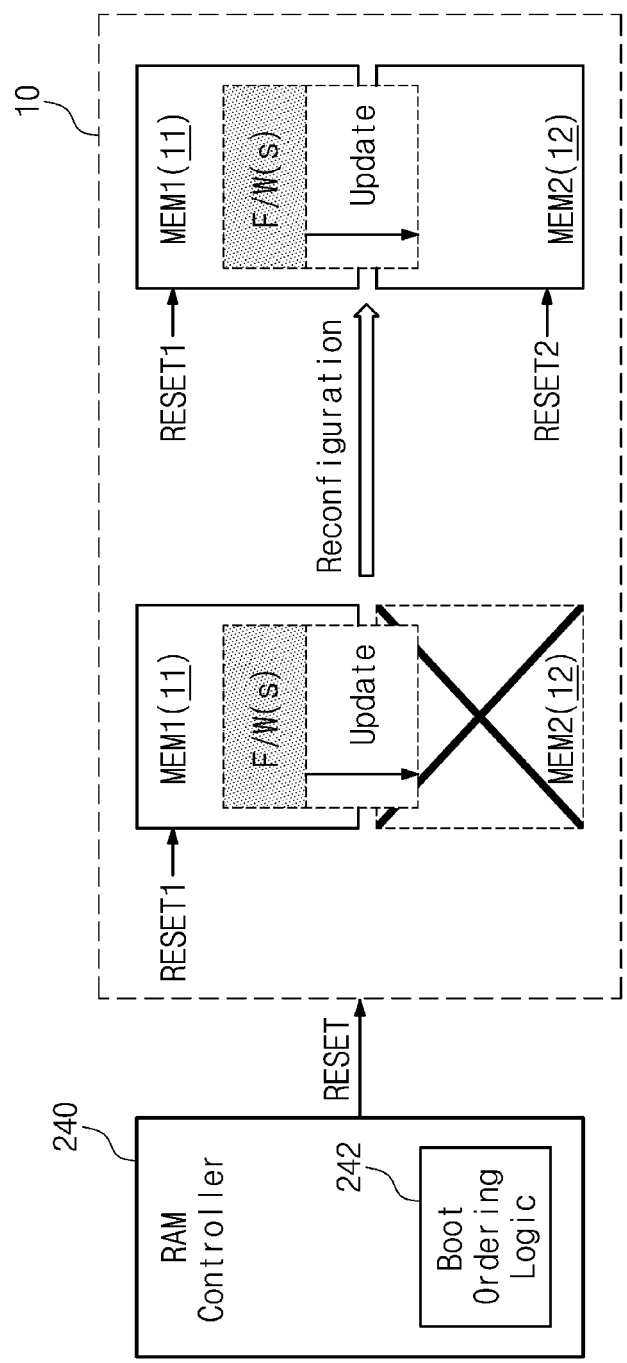
FIG. 11 is a block diagram conceptually illustrating how the number of memories to be booted is reconfigured, according to an embodiment of the present disclosure.

FIG. 11 is a block diagram conceptually illustrating how the number of memories to be booted is reconfigured, according to an embodiment of the present disclosure.

The above embodiments are described under the condition that only one memory of multiple memories is booted. However, an operating system OS or firmware FW needed to control an electronic device may be continuously updated and patched to higher versions. This accompanies the increase in capacity of the operating system OS or firmware FW. Therefore, in the case where the minimum capacity needed to drive the operating system OS and/or firmware FW thus updated or patched exceeds the capacity of a memory which is booted, the operating system OS and/or firmware FW may not operate normally. The embodiment of FIG. 11 suggests the solution to such a case.

The capacity of the first memory 11 is sufficient to drive firmware FW before update or patch. It is assumed that the capacity of the first memory 11 is insufficient to load and drive firmware FW after update or patch. In this case, a RAM controller 240 may perform a reconfiguration operation such that two or more memories of multiple memories are booted.

The reconfiguration operation may be performed at various time points. For example, if the update of the operating system OS and/or firmware FW is detected during an operation of an electronic device, the RAM controller 240 compares the capacity of a booting memory (e.g., the first memory 11) and the capacity of the operating system OS and/or firmware FW to be updated to obtain a comparison result, and determines whether the capacity of the booting memory is sufficient to drive the operating system OS and/or firmware FW to be updated.

In the case where it is determined that the capacity of the first memory 11 is insufficient to drive the operating system OS and/or firmware FW to be updated, the RAM controller 240 (in detail, boot ordering logic 242) may perform the reconfiguration operation such that multiple memories are booted. Boot ordering logic 242 may be, for example, a boot ordering logic circuit. Since it may be difficult to selectively boot only a single memory (e.g., the second memory 12) or fewer than all of multiple memories, during an operation of the electronic device the multiple memories may all be booted in a next booting operation of the electronic device.

As the reconfiguration operation is performed such that two or more memories are simultaneously booted, in a next booting operation of the electronic device, the updated or patched operating system OS and/or firmware FW may operate normally. For example, the updated or patched operating system OS and/or firmware FW may be appropriately distributed and loaded to two or more booted memories and may be driven by a processor (e.g., 110 of FIG. 1).

Figure 12:
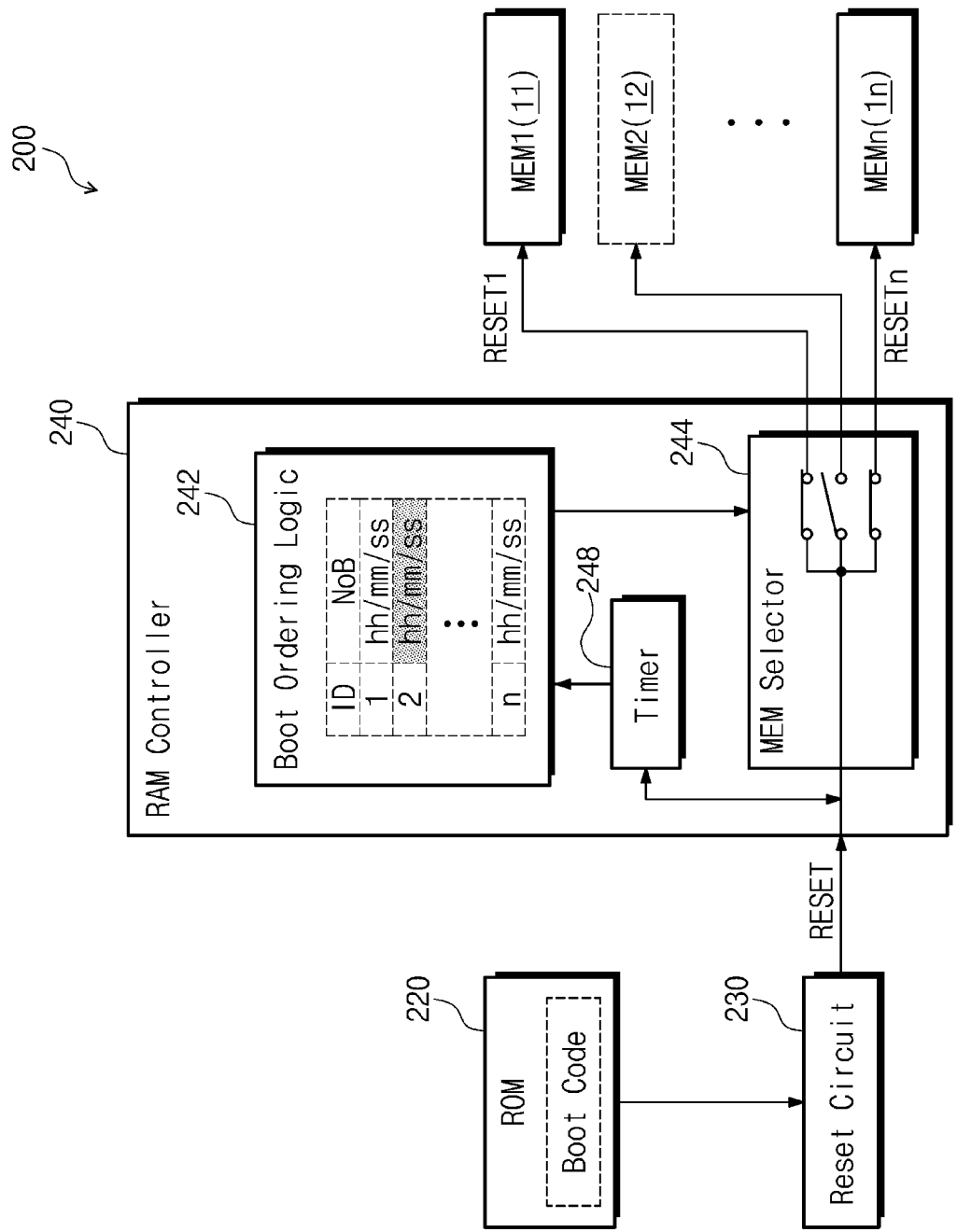
FIG. 12 is a block diagram illustrating an exemplary configuration of an electronic device according to an embodiment of the present disclosure.

FIG. 12 is a block diagram illustrating an exemplary configuration of an electronic device according to an embodiment of the present disclosure. An electronic device 200 may include a ROM 220, a reset circuit 230, and the RAM controller 240. The RAM controller 240 may include boot ordering logic 242, a memory selector 244, and a timer 248. In addition to components of the electronic device 200, the memories 11 to 1n connected to the electronic device 200 are illustrated together.

If the electronic device 200 is powered on, the boot code stored in the ROM 220 is executed, and thus, the reset signal RESET is generated by the reset circuit 230. The timer 248 detects the reset signal RESET and checks a first time point at which the reset signal RESET transitions from logical low to logical high. The boot ordering logic 242 controls the memory selector 244 by referring to a table (i.e., the booting-related information) including information about an ID and an operating time of each of the memories 11 to 1n, such that two memories having the shortest operating time are booted. The reset signal RESET is provided to the first memory 11 and the n-th memory 1n through a switching operation of the memory selector 144.

If the electronic device 200 is powered off, the timer 248 checks a second time point at which the reset signal RESET transitions from logical high to logical low. A time between the first time point and the second time point checked by the timer 248 may be an operating time of the first memory 11 and the n-th memory 1n. The boot ordering logic 242 may update the booting-related information, and the updated booting-related information may be utilized in a next booting operation.

In the embodiment of FIG. 12, two memories of the memories 11 to 1n are selected. However, the number of selected memories may not be limited thereto. That is, the reconfiguration operation may be performed by the boot ordering logic 142 such that the appropriate number of memories are selected depending on the capacity of the operating system OS and/or firmware FW.

In addition, with reference to FIG. 12, two or more memories are booted under control of the boot ordering logic 242 based on the operating times of the memories 11 to 1n. For example, as in the description given with reference to FIG. 5, the boot ordering logic 242 may select two or more memories to be booted among the memories 11 to 1n, based on the number of booting operations of each of the memories 11 to 1n.

Figure 13:
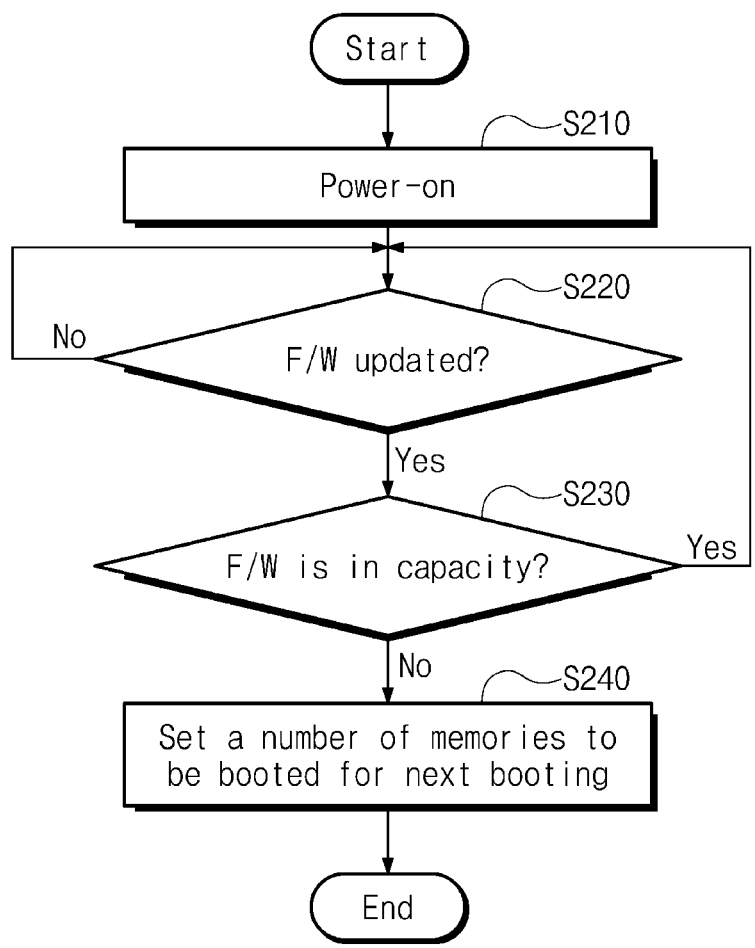
FIG. 13 is a flowchart illustrating an operating method of an electronic device according to an embodiment of the present disclosure.

FIG. 13 is a flowchart illustrating an operating method of an electronic device according to an embodiment of the present disclosure. In detail, the embodiment of FIG. 13 shows a reconfiguration operation of boot ordering logic. For better understanding, a description will be given with reference to FIG. 12 and FIG. 13 together.

In operation S210, the electronic device 200 is powered on. The boot code stored in a ROM (120 of FIG. 1) may be executed, and a reset signal may be generated by a reset circuit (130 of FIG. 1). According to the scheme described in the above embodiments, some memories of the memories 11 to 1n connected to the RAM controller 240 may be reset.

In operation S220, whether firmware (or an operating system) to be updated exists may be determined. If firmware (or an operating system) to be updated exists, operation S230 is performed.

In operation S230, a determination is made as to whether a capacity of a memory booted is sufficient to drive the firmware to be updated. If it is determined that the capacity of the booted memory is sufficient to drive the firmware to be updated, the RAM controller 240 may detect an additional update of firmware (S220). In contrast, in the case where the capacity of the booted memory is insufficient to drive the firmware to be updated, operation S240 is performed.

In operation S240, a reconfiguration operation is performed to reconfigure the number of memories to be booted. Since the capacity of the booted memory is insufficient to drive the firmware to be updated, the number of memories to be booted in a next booting operation may increase.

Figure 14:
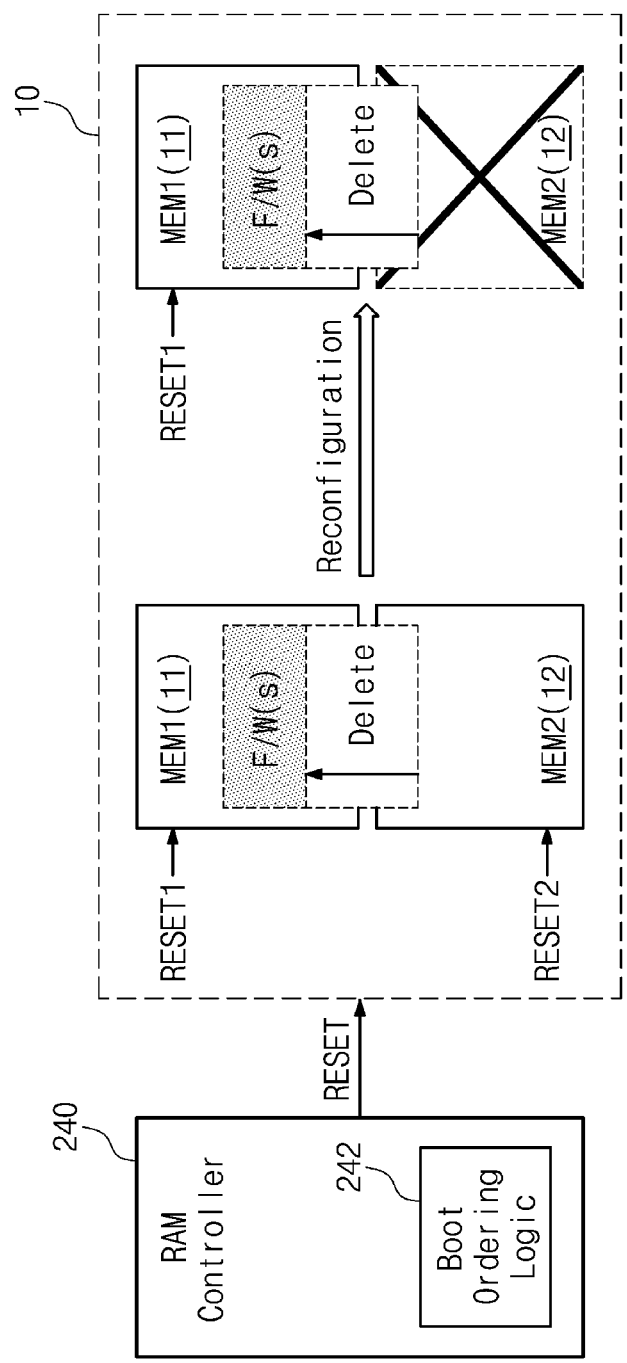
FIG. 14 is a block diagram conceptually illustrating how the number of memories to be booted is reconfigured, according to an embodiment of the present disclosure.

FIG. 14 is a block diagram conceptually illustrating how the number of memories to be booted is reconfigured, according to an embodiment of the present disclosure. Unlike the embodiment described with reference to FIGS. 11 to 13, the reconfiguration operation for decreasing the number of memories to be booted will be described.

It is assumed that the first memory 11 and the second memory 12 are simultaneously booted depending on the reconfiguration operation for increasing the number of memories to be booted. However, due to various causes (e.g., artificial deletion of a user and the like), a part of the operating system OS and/or firmware FW may be downgraded or deleted. In this case, it may be unnecessary to boot both the first memory 11 and the second memory 12.

To this end, the RAM controller 240 may periodically check the capacity of the operating system OS and/or firmware FW driven. If it is determined that it is no problem to drive the operating system OS and/or firmware FW even though the number of memories (amount of memories) to be booted decreases, the boot ordering logic 242 may perform the reconfiguration operation for decreasing the number of memories (amount of memories) booted. If the reconfiguration operation is completed, in a next booting operation, the reduced number of memories (e.g., any one of the first memory 11 and the second memory 12) may be booted.

Figure 15:
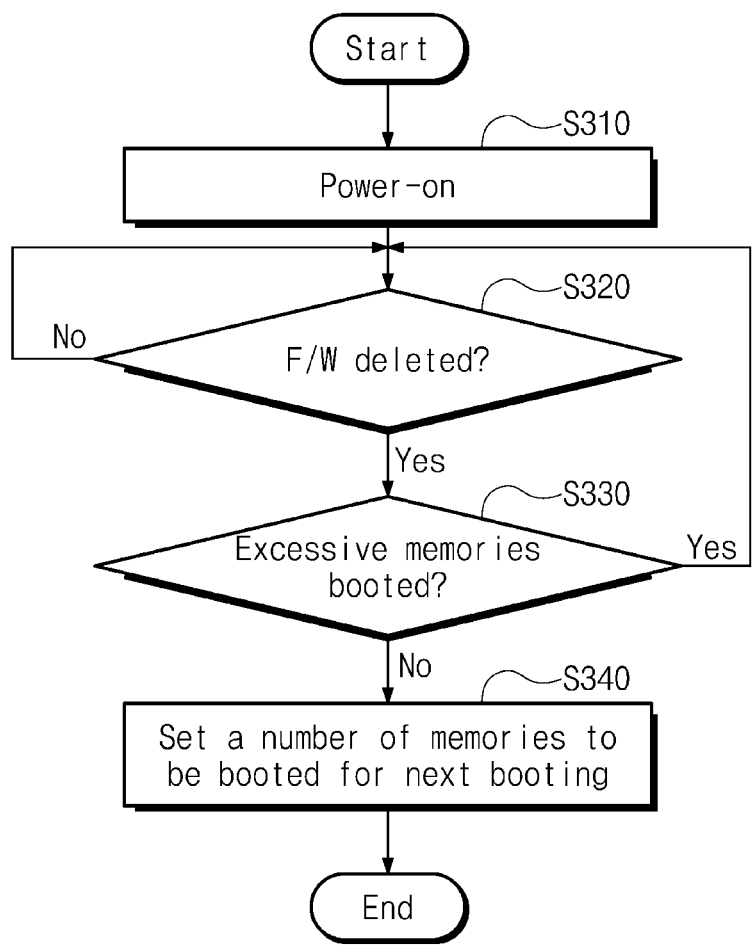
FIG. 15 is a flowchart illustrating an operating method of an electronic device according to an embodiment of the present disclosure.

FIG. 15 is a flowchart illustrating an operating method of an electronic device according to an embodiment of the present disclosure. For better understanding, a description will be given with reference to FIGS. 12 and 14 together.

In operation S310, the electronic device 200 is powered on.

In operation S320, whether to downgrade/delete firmware or to downgrade an operating system is requested is determined. The deletion or downgrade request may be artificially made by a user, but the nature of deletion or downgrade requests is not limited thereto. In the case where firmware downgrade or deletion is detected, operation S330 is performed.

In operation S330, whether memories are excessively booted is determined. For example, the boot ordering logic 242 may determine whether memories are excessively booted, by comparing the total capacity of an operating system or firmware to be executed by the boot code and the total capacity of memories to be booted at the same time, to obtain a comparison result.

If the capacity of memories to be booted is insufficient to drive an operating system or firmware in the case of decreasing the number of the memories (amount of the memories) to be booted, operation S320 may be performed. In contrast, if the capacity of memories to be booted is sufficient to drive an operating system or firmware in the case of decreasing the number of the memories to be booted, operation S340 may be performed.

In operation S340, a reconfiguration operation is performed to reconfigure the number of memories to be booted. Since memories are excessively booted, the number of memories to be booted in a next booting operation may decrease.

Figure 16:
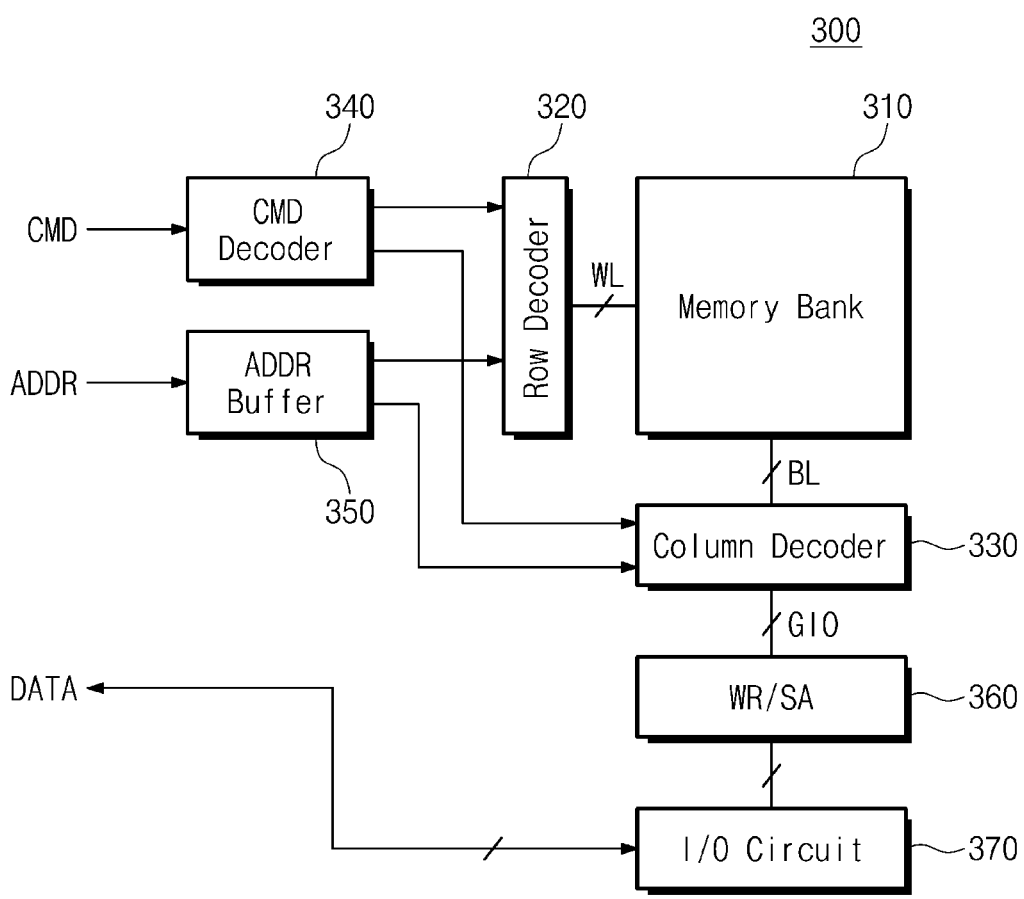
FIG. 16 is a block diagram illustrating any one of multiple memory devices described in the above embodiments.

FIG. 16 is a block diagram illustrating any one of the memory devices from first memory 11 to n-th memory 1n described in the above embodiments. Referring to FIG. 16, a memory device 300 may include a memory bank 310, a row decoder 320, a column decoder 330, a command decoder 340, an address buffer 350, a write driver and sense amplifier 360, and an input/output circuit 370.

The memory bank 310 may include multiple memory cells. The memory cells may be connected with word lines WL and bit lines BL. The memory cells may store data by controlling the word lines WL and the bit lines BL. Each of the memory cells may be a DRAM cell that includes a storage capacitor and a transmission transistor. Only one memory bank 310 is illustrated as an example, but the number of memory banks may be variously changed in compliance with the JEDEC standard.

The row decoder 320 may be connected with the memory bank 310 through the word lines WL. The row decoder 320 may select any one of the word lines WL based on a command CMD received from the command decoder 340 and an address ADDR received from the address buffer 350. For example, the address ADDR may be a row address, and the command CMD may be a row address strobe (RAS) signal.

The column decoder 330 may be connected with the memory bank 310 through the bit lines BL. The column decoder 330 may select any one of the bit lines BL based on the command CMD received from the command decoder 340 and the address ADDR received from the address buffer 350. For example, the address ADDR may be a column address, and the command CMD may be a column address strobe (CAS) signal.

The write driver and sense amplifier 360 may store write data in memory cells selected by the row decoder 320 and the column decoder 330. To this end, the write driver and sense amplifier 360 may drive input/output lines GIO. The write driver and sense amplifier 360 may read data from memory cells selected by the row decoder 320 and the column decoder 330. For example, the write driver and sense amplifier 360 may sense and amplify voltages of the input/output lines GIO determined according to the read data.

The command decoder 340 may receive and decode the command CMD from the outside (e.g., a host or a RAM controller). For example, the command decoder 340 may decode an active command, a write command, a read command, a precharge command, etc.

The address buffer 350 may receive and store the address ADDR from the outside. In detail, the address buffer 350 may receive and store a bank address and a row address RA associated with an active command, a column address CA associated with a write command or a read command, a bank address associated with a precharge command, an operation code for setting mode registers, etc.

The address buffer 350 may provide the row address RA to the row decoder 320 and may provide the column address CA to the column decoder 330. The address buffer 350 may provide the row address RA and the column address CA to the row decoder 320 and the column decoder 330, respectively.

The input/output circuit 370 may exchange data with the outside through multiple data lines.

Figure 17:
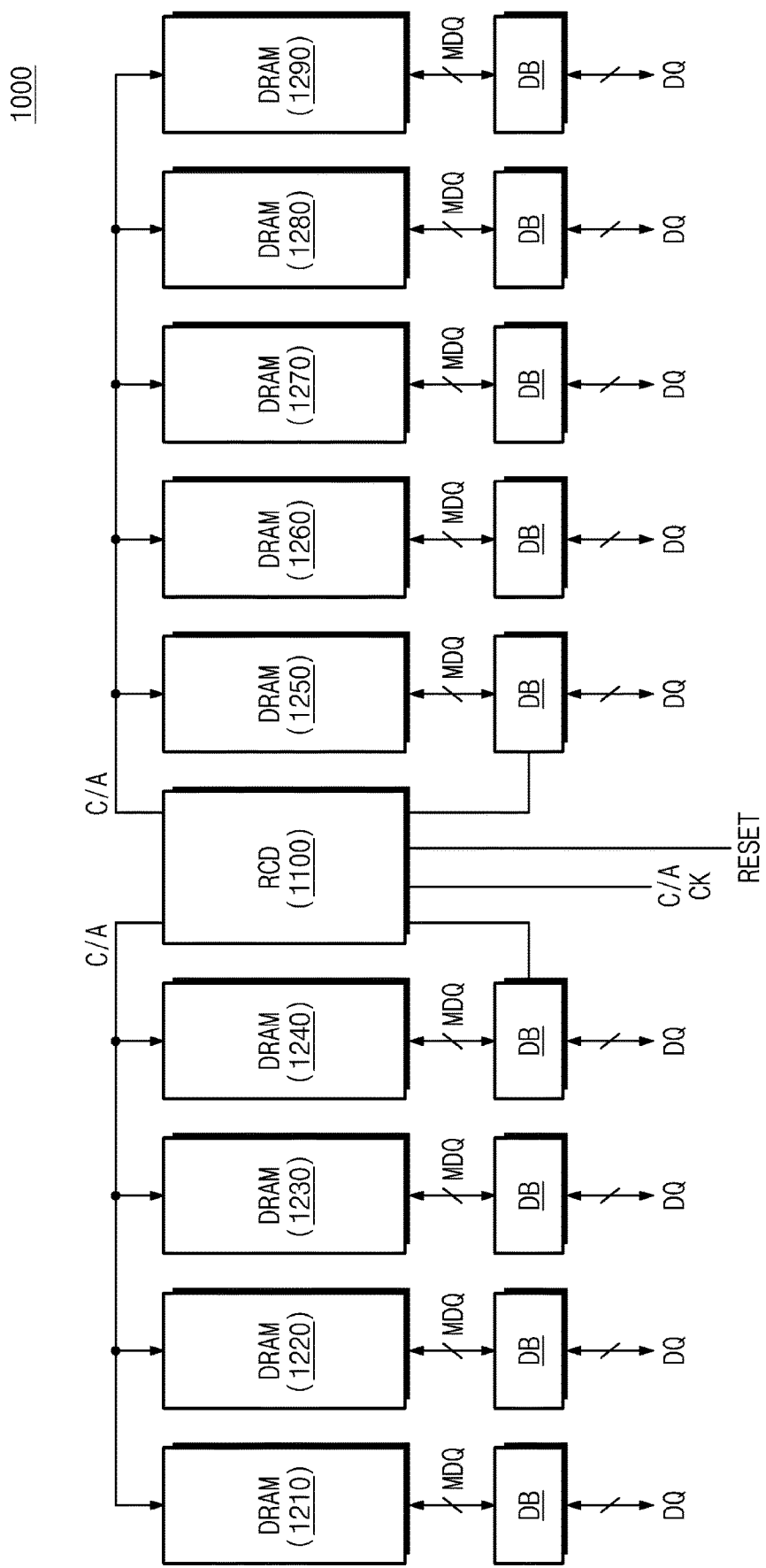
FIG. 17 is a block diagram illustrating a memory module connected to a RAM controller according to the present disclosure.

FIG. 17 is a block diagram illustrating a memory module 1000 connected to a RAM controller. For example, the memory module 1000 illustrated in FIG. 17 may have a structure of a load reduced dual in-line memory module (LRDIMM). The memory module 1000 may include a RCD 1100 (register clock driver), DRAM devices 1210 to 1290, and multiple data buffers DB.

The RCD 1100 may receive a command/address CA and a clock signal CK from the outside (e.g., a host or a RAM controller). Depending on the received signals, the RCD 1100 may provide the command/address CA to the DRAM devices 1210 to 1290 and may control the data buffers DB. In addition, the RCD 1100 may receive the reset signal RESET from a RAM controller to initialize the DRAM devices 1210 to 1290.

The DRAM devices 1210 to 1290 may be respectively connected with the data buffers DB through memory data lines MDQ. Prior to exchanging data with the outside, the DRAM devices 1210 to 1290 may be initialized by the reset signal RESET. The data buffers DB may exchange data with the outside (e.g., a host or a RAM controller) through multiple data lines DQ.

Figure 18:
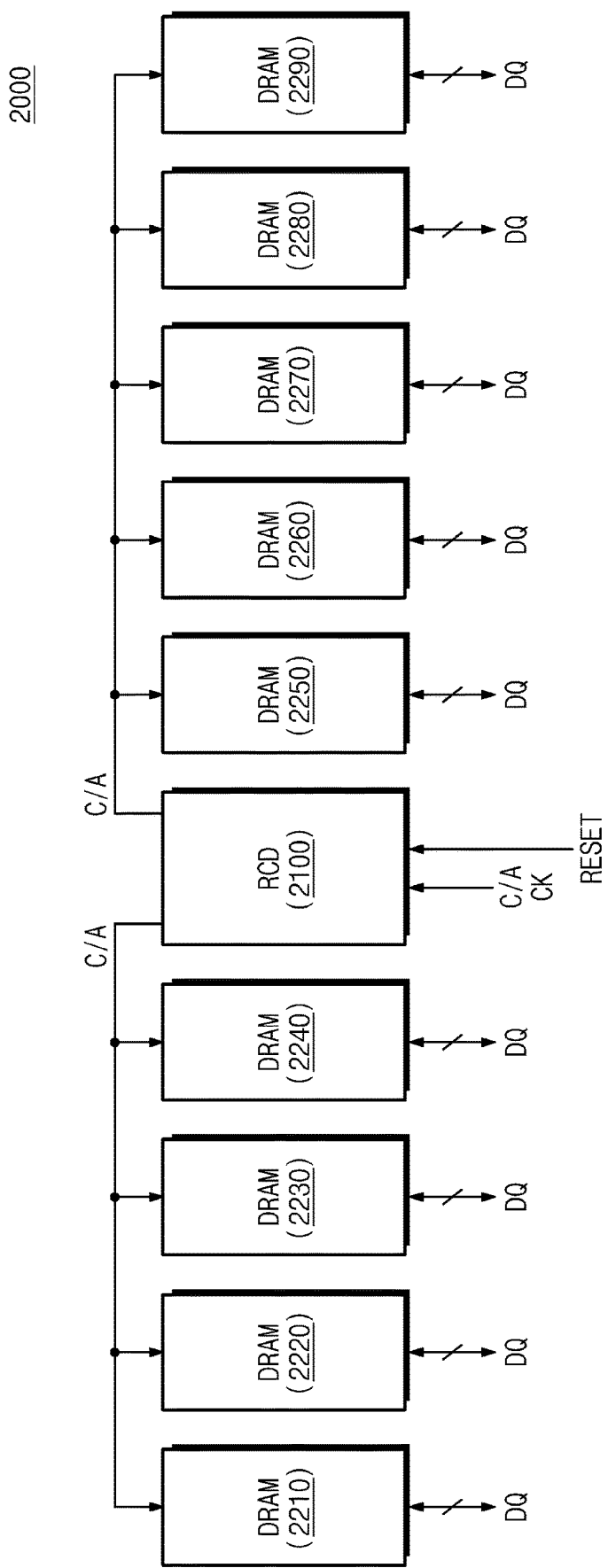
FIG. 18 is a block diagram illustrating a memory module connected to a RAM controller according to the present disclosure.

FIG. 18 is a block diagram illustrating a memory module 2000 connected to a RAM controller. In an embodiment, the memory module 2000 illustrated in FIG. 18 may have a structure of a registered dual in-line memory module (RDIMM). The memory module 2000 may not include a data buffer unlike the memory module 1000 illustrated in FIG. 17. For example, the memory module 2000 may be inserted into a DIMM socket to exchange data with the outside.

Figure 19:
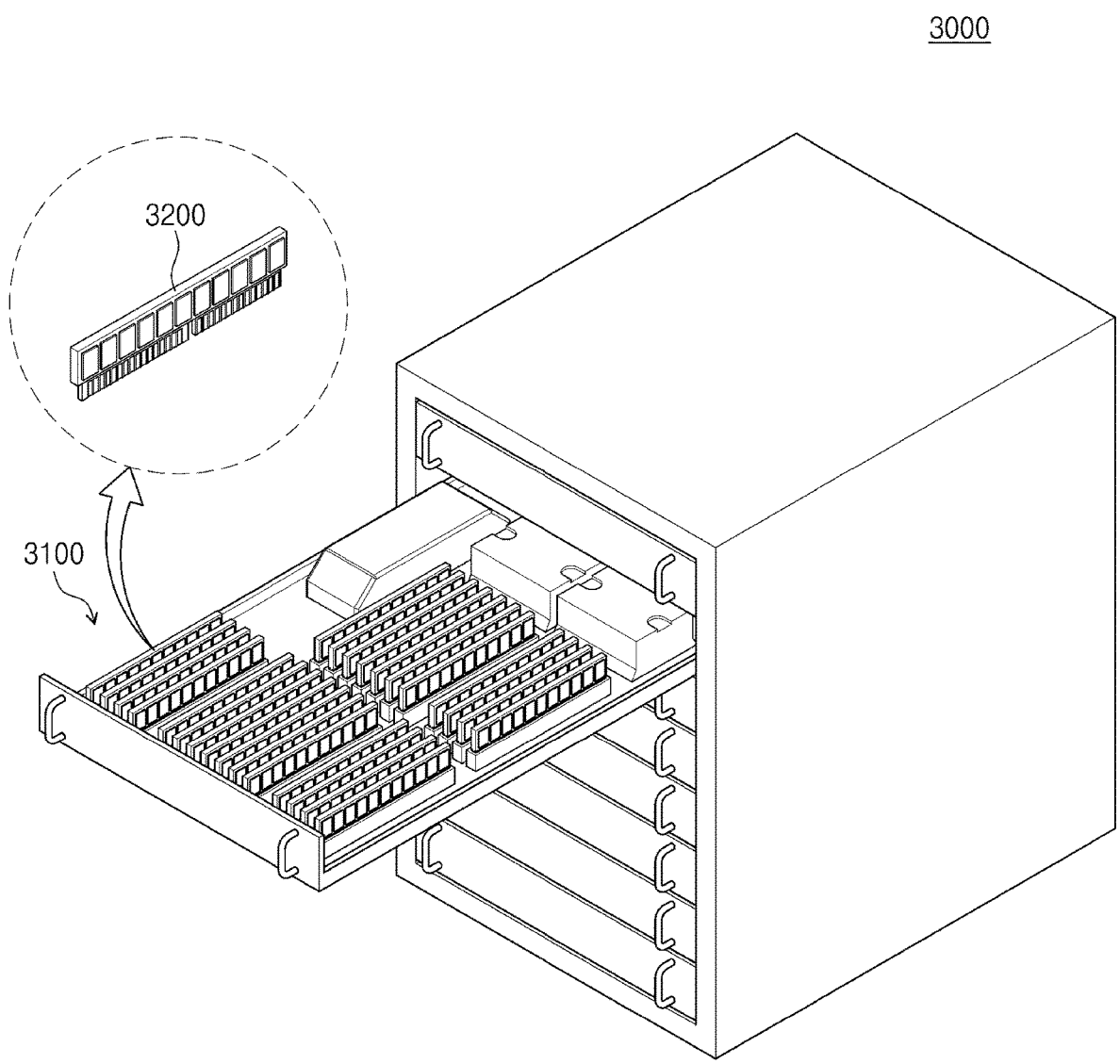
FIG. 19 is a view illustrating a server system to which a RAM controller according to an embodiment of the present disclosure and multiple memories connected to the RAM controller are applied.

FIG. 19 is a view illustrating a server system to which a RAM controller and multiple memories connected to the RAM controller are applied. Referring to FIG. 19, a server system 3000 may include multiple server racks 3100. Each of the server racks 3100 may include multiple memory modules 3200. The memory modules 3200 may be controlled by a RAM controller included in the server system 3000 or in each of the server racks 3100.

For example, the memory modules 3200 may have a form of a dual in-line memory module, may be inserted into a DIMM socket electrically connected to the RAM controller, and may communicate with the RAM controller. For example, the memory modules 3200 may be used as an operating memory of the server system 3000.

The memory modules 3200 constituting the server system 3000 may be booted according to the method described with reference to FIGS. 1 to 18. That is, all memories mounted in the server system 3000 are not booted, but the memories are booted based on the scheme described in the specification. Therefore, the number of memories to be booted unnecessarily may decrease. This may mean that the whole lifespan of the server system 3000 is extended.

According to embodiments of the present disclosure, not multiple memories but some memories of the memories are selectively booted based on booting-related information.

Since memories are prevented from being booted unnecessarily, the whole lifespan of the memories may be extended.

While the inventive concept(s) of the RAM controller configured to selectively boot memory and the method of operating the same have been described with reference to exemplary embodiments thereof, it will be apparent to those of ordinary skill in the art that various changes and modifications may be made thereto without departing from the spirit and scope of the present disclosure as set forth in the following claims.

What is claimed is:

1. A random-access memory controller connected with a plurality of memories, comprising:
   a reset control unit configured to selectively boot at least one memory of the plurality of memories based on booting-related information about the plurality of memories,
   wherein the booting-related information includes information about at least one of a number of booting operations of each of the plurality of memories and operating times respectively associated with the plurality of memories, and
   wherein the reset control unit is further configured to select a memory, which has the smallest number of booting operations or the shortest operating time, from among the plurality of memories as a memory to be selectively booted.

2. The random-access memory controller of claim 1, wherein the reset control unit is further configured to initialize the at least one memory by providing a reset signal to the at least one memory.

3. The random-access memory controller of claim 1, wherein the reset control unit includes:
   a boot ordering logic circuit configured to determine the memory to be selectively booted as a determination result, based on the booting-related information;
   a counter configured to count the number of booting operations of each of the plurality of memories to use as the basis of the booting-related information; and
   a memory selector configured to provide a reset signal to the at least one memory, based on the determination result of the boot ordering logic circuit.

4. The random-access memory controller of claim 1, wherein the reset control unit includes:
   a boot ordering logic circuit configured to determine the memory to be selectively booted as a determination result, based on the booting-related information;
   a timer configured to check respective operating times associated with the plurality of memories to use as the basis of the booting-related information; and
   a memory selector configured to provide a reset signal to the at least one memory, based on the determination result of the boot ordering logic circuit.

5. The random-access memory controller of claim 4, wherein the shortest operating time is based on a time between a first time point at which the reset signal transitions from logical low to logical high and a second time point at which the reset signal transitions from the logical high to the logical low.

6. The random-access memory controller of claim 1, wherein the plurality of memories are based on a double data rate (DDR) interface.

7. The random-access memory controller of claim 1, wherein the at least one memory is a first memory, and
   wherein, when a capacity of an operating system or firmware to be loaded to the first memory exceeds a capacity of the first memory, the reset control unit is further configured to selectively boot the first memory and a second memory of the plurality of memories.

8. The random-access memory controller of claim 7, wherein, when the random-access memory controller selectively boots one of the first memory and the second memory and the capacity of the operating system or the firmware to be loaded to the first memory and the second memory is smaller than a capacity of any one memory of the first memory and the second memory, the reset control unit is further configured not to selectively boot the remaining one of the first memory and the second memory other than the any one memory.

9. A method of operating a random-access memory controller connected with a plurality of memories, the method comprising:
   receiving a reset signal;
   selecting at least one memory of the plurality of memories as a selected at least one memory based on booting-related information about the plurality of memories; and
   providing the reset signal to the selected at least one memory,
   wherein the booting-related information includes information about at least one of a number of booting operations of each of the plurality of memories and operating times respectively associated with the plurality of memories, and
   wherein the selected at least one memory is selected based on having the smallest number of booting operations or the shortest operating time, from among the plurality of memories.

10. The method of claim 9, further comprising:
    updating information about the number of booting operations of the selected at least one memory as the booting-related information.

11. The method of claim 9, further comprising:
    checking a first time point at which the reset signal transitions from logical low to logical high; and
    checking a second time point at which the reset signal transitions from the logical high to the logical low.

12. The method of claim 11, further comprising:
    updating information about an operating time of the selected at least one memory as the booting-related information, based on a time between the first time point and the second time point.

13. The method of claim 9, further comprising:
    detecting an update of an operating system or firmware loaded to the selected at least one memory;
    comparing a capacity of the operating system or the firmware to be updated and a capacity of the selected at least one memory to obtain a comparison result; and
    adjusting an amount of memories to be selectively booted among the plurality of memories, based on the comparison result.

14. A random-access memory controller connected with a plurality of memories, comprising:
    a reset control unit configured to selectively boot at least one memory of the plurality of memories based on booting-related information about the plurality of memories,
    wherein the reset control unit is further configured to initialize the at least one memory by providing a reset signal to the at least one memory, and
    wherein the booting-related information includes at least one of first information about a number of booting operations of each of the plurality of memories and second information about an operating time of each of the plurality of memories,
    wherein the reset control unit is configured to provide the reset signal to the at least one memory, and the at least one memory has the smallest number of booting operations or has the shortest operating time, from among the plurality of memories.

15. The random-access memory controller of claim 14, wherein the reset control unit includes:
    a boot ordering logic circuit configured to determine a memory to be selectively booted as a determination result, based on the booting-related information;
    a counter configured to count a number of operating operations of each of the plurality of memories to use as a basis of the booting-related information, or a timer to check the operating time of each of the plurality of memories to use as the basis of the booting-related information; and
    a memory selector configured to provide the reset signal to the at least one memory, based on the determination result of the boot ordering logic circuit.

* * * * *